United States Patent [19]

Dorman et al.

[11] Patent Number: 4,608,419
[45] Date of Patent: Aug. 26, 1986

[54] CYCLIC IMINOETHER MODIFIED COPOLYMERS AS IMPROVED ADHESIVES

[75] Inventors: Linneaus C. Dorman; Victor E. Meyer, both of Midland, Mich.

[73] Assignee: The Dow Chemical Company, Midland, Mich.

[21] Appl. No.: 712,820

[22] Filed: Mar. 18, 1985

Related U.S. Application Data

[63] Continuation-in-part of Ser. No. 551,789, Nov. 14, 1983, abandoned.

[51] Int. Cl.$^4$ .............................................. C08F 8/00
[52] U.S. Cl. .............................. 525/329.9; 525/327.6; 525/375
[58] Field of Search .................. 525/327.6, 329.9, 375

[56] References Cited

U.S. PATENT DOCUMENTS

| | | | |
|---|---|---|---|
| 3,758,629 | 9/1973 | Thill | 525/375 |
| 4,056,502 | 11/1977 | Gross | 525/375 |
| 4,137,385 | 1/1979 | Reitz | 525/327.6 |
| 4,297,449 | 10/1981 | Goto | 525/327.6 |

*Primary Examiner*—Paul R. Michl

[57] ABSTRACT

A modified copolymer composition comprising a polymerizable olefin and an $\alpha,\beta$-ethylenically unsaturated carboxylic acid wherein at least a portion of the carboxyl groups have been converted to an ester/amide derivative by contact with a cyclic iminoether compound, e.g. 2-ethyl-2-oxazoline. A process for preparing the modified copolymer and a laminate structure where at least one of the plurality of layers is the modified copolymer.

13 Claims, No Drawings

CYCLIC IMINOETHER MODIFIED COPOLYMERS AS IMPROVED ADHESIVES

CROSS-REFERENCE TO RELATED APPLICATION

This Application is a Continuation-In-Part of U.S. Ser. No. 551,789, filed Nov. 14, 1983, abandoned.

BACKGROUND OF THE INVENTION

This invention relates generally to a modified copolymer of a polymerizable olefin and an $\alpha,\beta$-ethylenically unsaturated carboxylic acid contacted with a cyclic iminoether compound. Further, this invention relates to the use of this modified copolymer as an improved adhesive for forming laminates of plastic materials, or plastic and metal.

The use of thin film laminates is quite common especially where impermeability to gas, water or light is desirable. In one particular embodiment, laminates are used as food wraps to preserve their freshness. However, regardless of the use for a laminate, good adhesion of the various laminate layers is essential.

One family of adhesives commonly employed to adhere laminates are those formed from a polymerizable olefin and an $\alpha,\beta$-ethylenically unsaturated carboxylic acid such as ethylene acrylic acid as disclosed in U.S. Pat. No. 3,442,745. This group of copolymers is known in the art to be useful as an emulsion or hot melt adhesive for laminates. Despite their acceptance as an adhesive, it would be a useful improvement to increase adhesion, especially to plastics, in order to increase the integrity and applicability of laminates made therefrom.

A process for improving the adhesion of a copolymer adhesive is the subject of this invention. In particular, the ring-opening characteristic of a cyclic iminoether, such as an oxazoline ring, which is generally known in the art (E. M. Fry, J. Org. Chem., 15 802 (1950)) is employed to form a modified copolymer which surprisingly exhibits improved adhesion, especially to plastics.

SUMMARY OF THE INVENTION

In one aspect, the present invention is a modified copolymer composition comprising a polymerizable olefin comonomer and an $\alpha,\beta$-ethylenically unsaturated carboxylic acid comonomer wherein at least a portion of the carboxyl groups are contacted with a cyclic iminoether compound to provide an ester/amide derivative. The chemical modification involves the ring-opening of the cyclic iminoether compound to react with the carboxyl groups of the $\alpha,\beta$-ethylenically unsaturated carboxylic acid comonomer to form ester/amide derivatives. The ester/amide conversion of the free carboxyl groups can be either total or partial by adjusting the amount of cyclic iminoether compound and/or modifying the process conditions under which the copolymer and cyclic iminoether compound are contacted. The preferred cyclic iminoether is 2-oxazoline, the more preferred is 2-ethyl-2-oxazoline.

The present invention further provides for a process for preparing the modified copolymer by contacting a copolymer of a polymerizable olefin and an $\alpha,\beta$-ethylenically unsaturated carboxylic acid with a cyclic iminoether compound, treating the resultant mixture, whereby at least a portion of the carboxyl groups are converted to ester/amide derivatives to thereby form a modified copolymer. Further, the modified copolymer can be recovered and dried. The preferred cyclic iminoether compound is 2-oxazoline, the more preferred is 2-ethyl-2-oxazoline.

Still further, the present invention provides for a laminate structure formed from at least two dissimilar layers, wherein at least one layer is the modified copolymer composition. A three layer laminate is also provided wherein the middle layer is an adhesive comprising the modified copolymer composition of this invention.

DETAILED DESCRIPTION OF THE INVENTION

The polymerizable olefin comonomer in the modified copolymer of this invention has the structural formula $RCH=CH_2$ wherein R is functionally compatible with the cyclic iminoether reaction conditions. More specifically, wherein R is preferably a hydrogen, a straight chain alkyl of from 1 to 2 carbons, a branched-chain alkyl of from 1 to 5 carbons, an aryl ring of from 6 to 10 carbons or substituted aryl group thereof, a nitrile, an ester, a ketone or ether. The olefin comonomer is generally present from about 50 to about 95 percent by weight of the copolymer to be modified. Ethylene, propylene and styrene being the preferred olefin comonomers. The more preferred olefin comonomer is ethylene.

The $\alpha,\beta$-ethylenically unsaturated carboxylic acid comonomer in the modified copolymer of this invention can be characterized by the structural formula:

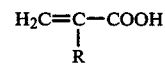

wherein R is hydrogen or a methyl group, i.e., acrylic and methacrylic acid. Acrylic acid is the preferred comonomer. The acid comonomer is generally present from about 50 to about 5 percent by weight of the copolymer to be modified.

The preferred copolymers of the subject invention are propylene/acrylic acid, ethylene/acrylic acid and styrene/acrylic acid. The more preferred copolymer is ethylene/acrylic acid (hereinafter EAA).

The copolymers as described above are modified to form the subject invention by contacting the copolymer with a cyclic iminoether, such as oxazoline, and treating the resultant mixture under conditions sufficient to convert at least a portion of the carboxyl groups of the copolymer to ester/amide derivatives. Preferably, at least 20 percent of the carboxyl groups are converted; most preferably essentially all the carboxyl groups are converted. Generally, the conversion conditions involve heating the mixture. The preferred temperature and time of contact for essentially total conversion are from about 100° to about 128° C. (b.p. of 2-ethyl-2-oxazoline) when at 1.0 atmospheric pressure for about 1 to about 24 hours. The more preferred parameters being from 120° to about 125° C. for 15 hours for total conversion of the carboxyl groups. Partial conversion can be obtained by adjusting the time and temperature of contact and the amount of cyclic iminoether admixed with the copolymer as illustrated in the examples herein. It is further understood that the conversion conditions can be varied depending upon the pressure, temperature and amount of reactants whereby the particular reaction time for total or partial conversion of the carboxyl groups to ester/amide derivatives would also vary.

It is essential that the subject modified copolymer not be crosslinked by the cyclic iminoether compound as this would detract from its suitability as an adhesive material. Therefore, the cyclic iminoether compounds employed are preferably mono-functional in that they react with only one carboxyl group to form an ester/amide derivative thereof. Suitable cyclic iminoether compounds are described below for preparing the subject non-crosslinked modified copolymer composition suitable for use as an adhesive.

The cyclic iminoether compound used in the invention is characterized by the structural formula:

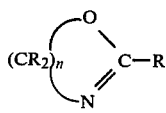

wherein n is 2 or 3 and the R groups are independently an alkyl, aryalkyl, aryl or H. Inasmuch as the iminoether functionality is the reactive portion of the compound, the other members that make up the remainder of the ring are not critical.

One representative of the cyclic iminoether compounds utilizable in this invention is oxazoline as is characterized by the structural formula:

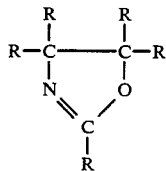

wherein the R groups are independently an alkyl, arylalkyl, aryl or H. This particular structure is generally recognized in the art as 2-oxazoline. The preferred 2-oxazoline is 2-ethyl-2-oxazoline (hereinafter EtOx).

EAA is a random copolymer of ethylene and acrylic acid. A chemical equation showing the reaction as between EAA and EtOx can be generally depicted as follows:

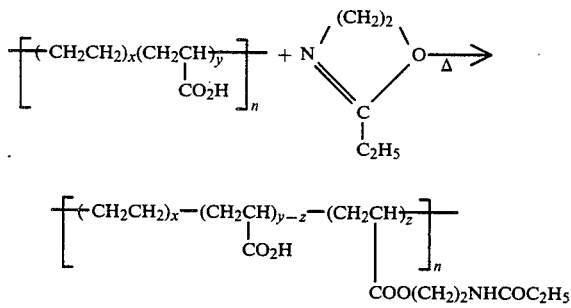

This reaction depicts a non-crosslinked final product, a modified copolymer of the subject invention, wherein partial conversion of the carboxyl groups has occurred where y is greater than z and x is a positive integer. Total conversion is also possible by adjusting the parameters of the reaction such that y is equal to z and x is a positive integer as will be shown in the following examples. It should be noted, however, that it is the ring-opening characteristic of the oxazoline ring which converts the free carboxyl group to an amide/ester derivative and, thus, this modification is independent of the particular olefin or carboxylic acid comonomers employed.

The reactant product, i.e. modified copolymer, is usually recovered by precipitation except where high carboxyl content causes the reactant product to adhere to the reaction vessel walls in which case the product is best removed by physically stripping it from the vessel. Both methods are demonstrated in the examples hereinafter.

The following examples are intended to illustrate the invention and are not intended to limit the scope thereof. In the examples, all parts and percentages are by weight unless otherwise specified.

Infrared analysis was used to indicate that the carboxyl groups were converted. Total conversion of the carboxyl groups is indicated by the absence of the carboxyl group carbonyl absorption band. For partial conversion elemental analysis of the reaction products is best employed to determine the nitrogen content of the product and therefore the amount of carboxyl groups converted to ester/amide groups.

Example 1 demonstrates the complete conversion of ethylene acrylic acid copolymer (18 percent acrylic acid) carboxyl groups.

EXAMPLE 1

A dry, 20 ml, heavy walled, glass pressure tube was charged with 2.0 g of EAA, with an average acrylic acid content of 18 percent, and 8 ml of EtOx. The tube was sealed with a citrate cap and heated in an oil bath at 102°–105° C. Complete solution resulted within 10 minutes and heating was continued for 21 hours. The slightly amber-colored solution was transferred to a beaker and allowed to cool. The resulting gel was diluted with 50 ml of methanol with stirring and the precipitated polymer was collected in a sintered glass funnel, washed with methanol and dried in vacuo for 8 hours at 60° C. The resulting homogeneous mass was analyzed by infrared to reveal the absence of carboxyl groups. The more relevant infrared frequencies observed were at 3300(N-H), 1730 (ester >C=O) and 1640 (amide >C=O) cm$^{-1}$. Absent from the spectrum was the characteristic acid >C=O absorption at 1700 cm$^{-1}$ present in the starting polymer EAA. The infrared data are consistent with the conversion of the carboxyl groups of EAA to the corresponding amide ester derivative.

Found: N, 2.86. Assuming the acrylic acid content of the EAA to be 18 percent, the calculated N content for the fully converted product is 2.80 percent. Thus, complete conversion of the carboxyl groups to ester/amide groups was achieved.

The following examples, Examples 2 and 3, demonstrate total carboxyl conversion where oxazoline is both the reactant and the solvent. Example 2 employs a recovery method of precipitating the reaction product with an alcohol, collecting the precipitate and drying the modified copolymer in vacuo; whereas, Example 3, which uses higher carboxyl group content, employs a recovery method of physically stripping the reaction product from the reaction vessel and drying the product by heating under vacuo.

EXAMPLE 2

To a 1-liter, 3-necked, round-bottomed flask equipped with a thermometer, air stirrer and a condenser with a drying tube (CaCl$_2$) were added 50 g of EAA (20 percent AA) and 200 ml of EtOx. The mixture was stirred and heated at 110°–112° C. for 21 hours whereupon the reaction mixture was transferred while hot to a 2-liter beaker and cooled in an ice bath under nitrogen. At about 35° C., the mixture was diluted with 1250 ml of methanol while stirring and chilled in ice water for 0.5 hour. The resulting pale yellow, granular precipitate was collected on a Buchner funnel, washed with methanol and dried in vacuo at 65°–80° C. for 24 hours.

The infrared spectrum of this product showed 100 percent carboxyl conversion which was essentially identical to the product obtained from Example 1.

EXAMPLE 3

The initial phase of this example was carried out in the same manner as described in Example 2 using 50 g of EAA (29.6 percent AA) and 200 ml of distilled EtOx. The reaction mixture was stirred and heated at 127°–128° C. for 1.8 hours, complete solution of the polymer beads occurred when the temperature reached 128° C. The reaction mixture was transferred to a round-bottomed flask and freed of the bulk EtOx in vacuo with the aid of a rotary evaporator at a maximum bath temperature of 50° C. The reaction mixture was further dried under vacuum at 0.6–0.75 mm for 4.5 hours at 50° C.

The residue, 74 g, adhered to the walls of the flask and, therefore, the modified copolymer was covered with hexane and the flask was stoppered and allowed to stand overnight. The product was removed with the aid of a spatula and transferred to a crystallizing dish in the form of long pieces. Residual hexane and EtOx were removed by heating in vacuo. The product behaved like a hot melt adhesive and was best removed from the glass dish with a spatula while warm and allowed to cool on a stainless steel surface. Drying, while contained in a glass jar, was continued at 85°–90° C. for 20 hours, whereafter a 0.8 g loss in weight was observed. The product was light golden in color. Found: N, 4.18; Calculated: N, 4.18 for complete conversion of the carboxyl reaction product.

Example 4 demonstrates a partial conversion of ethylene acrylic acid copolymer (20 percent acrylic acid) carboxyl groups wherein oxazoline is both the reactant and the solvent.

EXAMPLE 4

This sample was prepared exactly as in Example 2 except that the reaction mixture was heated at 109°–115° C. for only 1.6 hours. The resulting precipitate after collection and drying, as was done in Example 2, was a cream-white, amorphous solid whose elemental analysis of N, 1.86, gives a calculated 55 percent conversion of the carboxyl groups.

Example 5 demonstrates a complete carboxyl conversion wherein an oxazoline is the only reactant in a solventless, closed system.

EXAMPLE 5

The reaction of near stoichiometric amounts of ethylene acrylic acid and EtOx were carried out in a 20-ml Ace heavy-walled glass tube that was fitted with a Teflon brand lined citrate cap. The tube was loaded with 3.06 g of EAA (20 percent AA) which is 8.50 mmoles of carboxyl and 0.90 g of EtOx or 9.1 mmoles. The components were allowed to react in the closed tube for approximately 19 hours at 117°–135° C. The reaction product was collected and an IR spectrum revealed complete conversion of the carboxyl groups.

The following example (Example 6) demonstrates a partial carboxyl conversion technique wherein a stoichiometric amount of oxazoline is employed with an inert solvent.

EXAMPLE 6

To each of two 500-ml, 3-necked, round-bottomed flasks, equipped with a thermometer, air stirring assembly, condenser with drying tube (Drierite) and glass stopper and pre-purged with nitrogen, were added 30 g of EAA (29.6 percent AA) and 100 ml of chlorobenzene. The stirred mixtures were heated to 100° C. forming thick, but mobile gels. Heating was stopped and when the reaction mixtures' temperature had dropped to 92°–95° C., a solution of 3.1 g (25.4 percent of theory for complete conversion of —COOH) of EtOx in 10 ml of chlorobenzene was added to one of the reaction flasks (Run A) and a solution of 6.1 g (50 percent of theory for complete conversion of —COOH) of EtOx in 10 ml of chlorobenzene was added to the other reaction flask (Run B). Heating with continued stirring was resumed and continued at 125°–130° C. for 11 hours. At 110° C. the reaction mixtures were transferred to 1-liter beakers and each was diluted with a liter of methanol. After chilling for several hours and standing overnight, the top, slightly creamy layers were decanted and the lower layers were concentrated in 500-ml flasks in vacuo with the aid of a rotary evaporator. Product from Run A was removed from its flask by covering it first with hexane, allowing the mixture to stand, then stripping it from the walls of the flask. The product was rinsed by decantation and air dried.

Product from Run B was best removed from its flask by stripping under methanol with the aid of a spatula. The product was collected on a filter, rinsed and air dried.

Both products were further dried in glass vessels in vacuo at 80° C. for 8 hours. Obtained from Run A was 28.2 g of an amber gum. Found: N, 1.22, corresponding to a 24 percent conversion of —COOH to —COOCH$_2$CH$_2$NHCOC$_2$H$_5$. Obtained from Run B was 31.1 g of an amber gum. Found: N, 2.20, corresponding to a 46 percent conversion of —COOH groups.

Adhesion Studies

Comparative adhesion testing was conducted on modified copolymers of the subject invention versus unmodified copolymers. The copolymers were used as an adhesive layer between two 5-mil thick sheets of laminate material and compression molded. The samples were prepared by placing them into a ram press preheated to 180° C. and subjected to 40,000 lbs of 4-inch ram pressure for 4 minutes at 180° C. The press was then cooled to room temperature before releasing pressure and the samples were removed and cut into 1-inch strips. These strips were then tested in a T-peel adhesion test on an Instron tester at a crosshead speed of 0.2 in./minute. The results are shown in the Table which follows ("———", indicates samples were not measured).

TABLE

| Example* | Copolymer | % Acid Content | % of Converted Carboxyl Group | T-Peel Adhesion | | |
|---|---|---|---|---|---|---|
| | | | | Mylar*** g/in | Polypropylene g/in | Aluminum lb/in |
| A | EAA** | 6.5 | 0 | 15–16 | 20–30 | 30–31 |
| | EAA | 6.5 | 100 | 15–16 | 200 | 10–12 |
| B | EAA | 9.0 | 0 | 5–6 | — | 31–32 |
| | EAA | 9.0 | 100 | 5–8 | — | 22–24 |
| C | EAA | 20.0 | 0 | 20–40 | 20–30 | 2–5 |
| | EAA | 20.0 | 55 | 200–400 | — | — |
| | EAA | 20.0 | 100 | 1000–1400 | 600 | 20–22 |
| D | EAA | 29.6 | 0 | 45 | 20–30 | 30–34 |
| | EAA | 29.6 | 100 | 3200 | 700 | 19–20 |

*Examples A–D are each comparative examples.
**EAA is ethylene acrylic acid.
***Mylar Brand polyester film.

The table shows increased adhesion of the modified ethyl/acrylic acid copolymer to Mylar brand polyester film (poly(ethyleneterephthalate), commercially available from E. I. du Pont de Nemours & Co.) especially in the higher acid content samples, i.e., 20 and 29.6 percent. The modified copolymer at the 20 percent acid content level with 100 percent carboxyl group conversion showed a superior improvement of 40 times over the unmodified copolymer. Even at the lower conversion level of 55 percent the modified copolymer showed a significant improvement of 10 times over the unmodified copolymer.

With respect to the polypropylene laminates, the modified copolymer showed excellent adhesion at all acid content levels tested. In particular, at the 100 percent conversion level for the 20 percent acid content copolymer an improvement of 24 times was observed. Finally with regard to the aluminum laminate, it is seen that the modified copolymer exhibited adhesion levels which are lower than the unmodified copolymer but still acceptable.

As shown by the table, the modified copolymers of the present invention are improved adhesives for use in laminate systems, particularly plastic laminates. The modified copolymer can be employed using conventional adhesive application means to disperse a layer of modified copolymers between similar or dissimilar laminate layers.

One exemplary method can comprise pressing the modified copolymer in a molten state between laminate layers having a melting point(s) above the melting point of the modified copolymer. The laminate layers are pressed together contacting the modified copolymer on the surfaces to be bonded and allowing the modified copolymer to harden by cooling to ambient temperature.

Another method of adhering laminates with the modified copolymer can comprise the simultaneous coextrusion of the modified copolymer between the extruded laminate layers. Still further, the modified copolymer can be placed between the layers of laminate to be bonded in the form of a layered material. This assembly can then be heated under pressure at a temperature above the melting point of the modified copolymer to contact the molten copolymer with the surfaces of the laminate layers to be bonded and, then the entire assembly is allowed to cool to ambient temperature.

What is claimed is:

1. A copolymer adhesive composition, comprising (i) a polymerizable olefin and (ii) an α,β-ethylenically unsaturated carboxylic acid, wherein at least a portion of the carboxyl groups present on said (ii) are converted to an ester/amide derivative by reacting said carboxyl groups with a cyclic iminoether compound characterized by the structural formula:

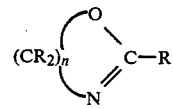

wherein the R groups are independently an alkyl, arylalkyl, aryl or H and n is 2 or 3, whereby said copolymer adhesive composition is not crosslinked.

2. The copolymer as recited in claim 1 wherein the cyclic iminoether compound is 2-oxazoline.

3. The copolymer as recited in claim 2 wherein the 2-oxazoline compound is 2-ethyl-2-oxazoline.

4. The copolymer as recited in claim 1 wherein the polymerizable olefin is ethylene.

5. The copolymer as recited in claim 1 wherein the α,β-ethylenically unsaturated carboxylic acid is acrylic acid.

6. A process for preparing a copolymer adhesive comprising the steps of
 (a) contacting a copolymer comprising
  (i) a polymerizable olefin, and
  (ii) an α,β-ethylenically unsaturated carboxylic acid with a cyclic iminoether compound characterized by the structural formula:

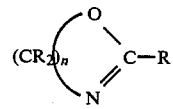

wherein the R groups are independently an alkyl, arylalkyl, aryl or H and n is 2 or 3; and
 (b) treating the resultant admixture under conditions sufficient to convert at least a portion of the carboxyl groups present on said (ii) to an ester/amide derivative whereby said copolymer adhesive composition is not crosslinked.

7. The process as recited in claim 6 which includes the additional steps of recovering the copolymer so made; and drying the modified copolymer.

8. The process as recited in claim 6 wherein the copolymer in step (a) is ethylene/acrylic acid.

9. The process as recited in claim 6 wherein the treating step (b) is carried out to convert essentially all of the carboxyl groups to an ester/amide derivative.

10. The process as recited in claim 9 wherein the treating step (b) is carried out at a temperature within the range of from about 100° to about 128° C. when at 1.0 atmospheres and for a time within the range of from about 1 to about 24 hours.

11. A laminate structure formed from at least two dissimilar layers, wherein at least one layer is a copolymer composition comprising (i) a polymerizable olefin and (ii) an α,β-ethylenically unsaturated carboxylic acid; and wherein at least a portion of the carboxyl groups present on said (ii) is converted to an ester/amide derivative by reacting said carboxyl groups with a cyclic iminoether compound characterized by the structural formula:

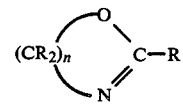

wherein the R groups are independently an alkyl, arylalkyl, aryl or H and n is 2 or 3, whereby said copolymer composition is not crosslinked.

12. The laminate structure as recited in claim 11 wherein three layers are employed, the middle layer being an adhesive consisting of said copolymer composition.

13. The laminate structure as recited in claim 11 wherein the layers comprise, in addition to the adhesive layer, one or more materials which are independently plastic or metal.

* * * * *